United States Patent
Yang et al.

(10) Patent No.: US 10,361,919 B2
(45) Date of Patent: Jul. 23, 2019

(54) SELF-HEALING AND DYNAMIC OPTIMIZATION OF VM SERVER CLUSTER MANAGEMENT IN MULTI-CLOUD PLATFORM

(71) Applicant: AT&T Intellectual Property I, L.P., Atlanta, GA (US)

(72) Inventors: Chen-Yui Yang, Marlboro, NJ (US); David H. Lu, Irving, TX (US); Scott Baker, Apex, NC (US); Anthony M. Srdar, Gainesville, GA (US); Gabriel Bourge, N. Aurora, IL (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 374 days.

(21) Appl. No.: 14/936,095

(22) Filed: Nov. 9, 2015

(65) Prior Publication Data
US 2017/0134237 A1    May 11, 2017

(51) Int. Cl.
| | |
|---|---|
| G06F 15/173 | (2006.01) |
| H04L 12/24 | (2006.01) |
| H04L 12/26 | (2006.01) |
| G06F 9/455 | (2018.01) |

(52) U.S. Cl.
CPC .......... *H04L 41/12* (2013.01); *G06F 9/45558* (2013.01); *H04L 41/0816* (2013.01); *H04L 41/0823* (2013.01); *H04L 41/0896* (2013.01); *H04L 41/5009* (2013.01); *H04L 41/5025* (2013.01); *H04L 43/0876* (2013.01); *H04L 43/16* (2013.01); *G06F 2009/45591* (2013.01); *G06F 2009/45595* (2013.01)

(58) Field of Classification Search
CPC ............................ H04L 41/12; G06F 9/45558
USPC ........................................................ 709/224
See application file for complete search history.

(56) References Cited

U.S. PATENT DOCUMENTS

| | | | | |
|---|---|---|---|---|
| 4,845,637 A | * | 7/1989 | Basarath ............. | H02J 13/0003 700/286 |
| 7,130,779 B2 | | 10/2006 | Elie-dit-cosaque et al. | |
| 7,278,053 B2 | | 10/2007 | Durica et al. | |

(Continued)

FOREIGN PATENT DOCUMENTS

| | | |
|---|---|---|
| CN | 104333459 A | 7/2014 |
| EP | 2874061 A1 | 5/2015 |

(Continued)

OTHER PUBLICATIONS

"Best Practices for Virtualizing and Managing SQL Server" Microsoft, May 2013 http://www.cchpsc.org/media/Best_Practices_for_Visualizing_and_Managing_SQL_Server_2012.pdf.

(Continued)

*Primary Examiner* — Imad Hussain (57) ABSTRACT

Virtual machine server clusters are managed using self-healing and dynamic optimization to achieve closed-loop automation. The technique uses adaptive thresholding to develop actionable quality metrics for benchmarking and anomaly detection. Real-time analytics are used to determine the root cause of KPI violations and to locate impact areas. Self-healing and dynamic optimization rules are able to automatically correct common issues via no-touch automation in which finger-pointing between operations staff is prevalent, resulting in consolidation, flexibility and reduced deployment time.

18 Claims, 9 Drawing Sheets

(56) References Cited

U.S. PATENT DOCUMENTS

| | | | |
|---|---|---|---|
| 7,457,872 B2 | 11/2008 | Aton et al. | |
| 7,543,052 B1 | 6/2009 | Cesa Klein | |
| 7,930,741 B2 | 4/2011 | Banzhof et al. | |
| 8,014,308 B2* | 9/2011 | Gates, III | H04L 12/66 370/252 |
| 8,055,952 B2* | 11/2011 | Avritzer | G06F 11/1438 714/38.12 |
| 8,125,890 B2 | 2/2012 | Saltsidis | |
| 8,359,223 B2 | 1/2013 | Chi et al. | |
| 8,381,033 B2 | 2/2013 | Franklin et al. | |
| 8,385,353 B2 | 2/2013 | Salam et al. | |
| 8,612,590 B1 | 12/2013 | Tung et al. | |
| 8,862,727 B2 | 10/2014 | Jayachandran et al. | |
| 8,862,738 B2 | 10/2014 | Madduri et al. | |
| 8,909,208 B2 | 12/2014 | Loborg et al. | |
| 8,990,629 B2 | 3/2015 | Salame | |
| 9,154,549 B2* | 10/2015 | Sundararaj | G06F 9/505 |
| 9,270,557 B1* | 2/2016 | Shpilyuck | H04L 41/5016 |
| 9,286,099 B2* | 3/2016 | Cai | G06F 9/45533 |
| 9,465,630 B1* | 10/2016 | Muniz | G06F 9/455 |
| 9,600,332 B2* | 3/2017 | Patel | G06F 9/4862 |
| 9,836,328 B2* | 12/2017 | Bobroff | G06F 9/45558 |
| 2005/0180647 A1* | 8/2005 | Curry | G06K 9/00456 382/243 |
| 2007/0050644 A1* | 3/2007 | Merkin | G06F 1/206 713/300 |
| 2007/0233866 A1* | 10/2007 | Appleby | H04L 67/1008 709/226 |
| 2008/0320482 A1 | 12/2008 | Dawson et al. | |
| 2010/0058342 A1* | 3/2010 | Machida | G06F 9/5077 718/1 |
| 2010/0229108 A1* | 9/2010 | Gerson | G06F 3/011 715/757 |
| 2010/0274890 A1* | 10/2010 | Patel | G06F 9/4862 709/224 |
| 2011/0078106 A1* | 3/2011 | Luchi | G06F 11/3452 706/48 |
| 2011/0126047 A1* | 5/2011 | Anderson | H04L 9/3213 714/15 |
| 2011/0138037 A1* | 6/2011 | Sharma | G06F 9/505 709/224 |
| 2011/0279297 A1* | 11/2011 | Oettinger | H03M 1/20 341/122 |
| 2012/0159248 A1* | 6/2012 | Inamdar | G06F 11/0712 714/25 |
| 2012/0324441 A1* | 12/2012 | Gulati | G06F 9/5088 718/1 |
| 2012/0324444 A1* | 12/2012 | Gulati | G06F 9/5088 718/1 |
| 2013/0014107 A1* | 1/2013 | Kirchhofer | G06F 9/5083 718/1 |
| 2013/0055260 A1* | 2/2013 | Zlotkin | G06F 9/4856 718/1 |
| 2013/0086188 A1* | 4/2013 | Mays | H04L 51/36 709/206 |
| 2013/0111467 A1 | 5/2013 | Sundararaj | |
| 2013/0174152 A1* | 7/2013 | Yu | G01R 21/00 718/1 |
| 2013/0219386 A1 | 8/2013 | Geibel et al. | |
| 2013/0274000 A1* | 10/2013 | Novotny | A63F 13/12 463/25 |
| 2013/0290499 A1* | 10/2013 | Radhakrishnan | G06F 9/505 709/223 |
| 2014/0058871 A1* | 2/2014 | Marr | G06F 9/45533 705/26.1 |
| 2014/0082202 A1* | 3/2014 | Zhao | G06F 9/45558 709/226 |
| 2014/0089921 A1* | 3/2014 | Yang | G06F 9/45558 718/1 |
| 2014/0122707 A1 | 5/2014 | de Assuncao et al. | |
| 2014/0196033 A1* | 7/2014 | Bobroff | G06F 9/45558 718/1 |
| 2014/0270136 A1 | 9/2014 | Thomson et al. | |
| 2014/0280488 A1* | 9/2014 | Voit | H04L 67/10 709/203 |
| 2014/0289551 A1 | 9/2014 | Balakrishnan | |
| 2014/0351649 A1 | 11/2014 | Madani et al. | |
| 2015/0074262 A1* | 3/2015 | Antony | H04L 47/125 709/224 |
| 2015/0081847 A1* | 3/2015 | Hao | H04L 65/4076 709/219 |
| 2015/0212857 A1* | 7/2015 | Beveridge | G06F 9/5011 718/1 |
| 2015/0281312 A1* | 10/2015 | Bragstad | H04L 41/5025 709/219 |
| 2015/0281313 A1* | 10/2015 | Bragstad | G06F 16/24568 709/219 |
| 2016/0019076 A1* | 1/2016 | Lawler | G06F 9/45558 718/1 |
| 2016/0196089 A1* | 7/2016 | Gadre | G06F 3/0647 711/114 |
| 2017/0005865 A1* | 1/2017 | Liu | H04L 41/0843 |
| 2017/0054690 A1* | 2/2017 | Barsness | H05K 999/99 |

FOREIGN PATENT DOCUMENTS

| | | |
|---|---|---|
| WO | 2009014493 A8 | 1/2009 |
| WO | 2014158066 A1 | 10/2014 |

OTHER PUBLICATIONS

"Oracle Solaris Administration: Common Tasks Fault Management Overview" Oracle, Part No. 821-1451-11, Dec. 2011; http://docs.oracle.com/cd/E23824_01/html/8211451/gliqg.html.

"A Perfect Fit: IBM XIV® Storage System with VMware® for Optimized Storage Server Virtualization" IBM, White Paper, Oct. 2010; ftp://public.dhe.ibm.com/storage/isv/A_Perfect_Fit_IBM_XIV_and_VMware.pdf.

De Simone, Luigi. "Towards Fault Propagation Analysis in Cloud Computing Ecosystems." Software Reliability Engineering Workshops (ISSREW), 2014 IEEE International Symposium on. IEEE, 2014. http://www.researchgate.net/profile/Luigi_De_Simone/publication/267980548_Towards_Fault_Propagation_Analysis_in_Cloud_Computing_Ecosystems/links/54e7248b0cf277664ff79c5d.pdf.

Yuvaruj, K., et al. "Secure Cloud Consistency Based on SLA System Using KPI." (2015). http://www.ijcsmc.com/docs/papers/February2015/V4I2201554.pdf.

\* cited by examiner

| KPI Name | Description | Design Value Convention | Decision Point Adjustment Factor |
|---|---|---|---|
| Load | Unix system load average | 90% | 30 units or > 2 standard deviations |
| InNICUtil | NIC utilization for incoming traffic [%] | 90% | 90% or > previous max + 5% |
| OutNICUtil | NIC utilization for outgoing traffic [%] | 90% | 90% or > previous max + 5% |
| CPU | CPU utilization [%] | 85% | 85% or ~2 SD from mean |
| Memory | Physical memory utilization [%] | 80% | 80% or ~2 SD from mean |
| Swap | SW utilization [%] | 80% | 80% |
| DiskAvl | Available disk space [%] | 95% | 5% or ~2 SD from mean |
| PgOutRate | Rate of memory pages swap-out [pages/sec] | 90% | 140pps or ~4 SD from mean |
| ActiveProc | Number of active processes | 95% | >1200 |
| ProcRuntime | Max allowed runtime for backend batch processing | 95% | Varies. Typically >300 seconds |
| Httpd Connections | Count of active connections to webserver | 90% | >255 connections |

SELF-HEALING AND DYNAMIC OPTIMIZATION OF VM SERVER CLUSTER MANAGEMENT IN MULTI-CLOUD PLATFORM

TECHNICAL FIELD

Embodiments of the present disclosure relate to the performance monitoring of network functions in a virtual machine server cluster. Specifically, the disclosure relates to using self-healing and dynamic optimization (SHDO) of virtual machine (VM) server cluster management to support closed loop automation.

BACKGROUND

A virtual network combines hardware and software network resources and network functionality into a single, software-based administrative entity. Virtual networking uses shared infrastructure that supports multiple services for multiple offerings.

Network virtualization requires moving from dedicated hardware to virtualized software instances to implement network functions. Those functions include control plane functions like domain name servers (DNS), Remote Authentication Dial-In User Service (RADIUS), Dynamic Host Configuration Protocol (DHCP) and router reflectors. The functions also include data plane functions like secure gateways (GW), virtual private networks (VPN) and firewalls.

The rapid growth of network function virtualization (NFV), combined with the shift to the cloud computing paradigm, has led to the establishment of large-scale software-defined networks (SDN) in the IT industry. Due to the increasing size and complexity of multi-cloud SDN infrastructure, a technique is needed for self-healing & dynamic optimization of VM server cluster management in the SDN ecosystem to achieve high and stable performance of cloud services.

BRIEF DESCRIPTION OF THE DRAWINGS

The present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION OF EXEMPLARY EMBODIMENTS

As more organizations adopt virtual machines into cloud data centers, the importance of an error-free solution for installing, configuring, and deploying all software (operating system, database, middleware, applications, etc.) for virtual machines in cloud physical environments dramatically increases. However, performance monitoring of virtual network functions (VNF) and VM components in the network virtualization world is not always an easy task.

Presently disclosed is a solution for designing and deploying a self-healing virtual machine management tool that will support dynamic performance optimization. The solution provides flexibility, consolidation, increased customer satisfaction and reduced costs via no-touch automation. The new methodology uses historical statistics to determine a threshold of a given value and to autonomously trigger optimization within a self-healing environment. The disclosed techniques provide an innovative automated approach to design and deploy self-healing of VM server cluster management to support performance optimization management of VNF and VM.

In sum, the present disclosure develops a new methodology to derive adaptive quality metrics to autonomously trigger optimization of NFV and management structure of self-healing and dynamic optimization (SHDO) of VM server cluster management to support closed loop automation. In particular, an adaptive thresholding methodology is described for developing actionable quality metrics for benchmarking and anomaly detection. Further, real time analytics are described for root cause determination of key performance indicator (KPI) violation and impact areas. Additionally, self-healing policy management and dynamic optimizing performance tuning are implemented, including reducing system load, disk tuning, SCSI tuning, virtual memory system tuning, kernel tuning, network interface card tuning, TCP tuning, NFS tuning, JAVA tuning, etc.

In certain embodiments of the present disclosure, a method is provided for managing a virtual machine server cluster in a multi-cloud platform by monitoring a plurality of quality metrics. For each of the quality metrics, the quality metric is classified as one of a plurality of predetermined quality metric types, accumulated measurement values are recorded for the quality metric, a statistical value is calculated from the accumulated measurement values, and an adaptive threshold range is determined for the quality metric based on the statistical value and based on the predetermined quality metric type.

It is then determined that a statistical value for a particular quality metric is outside the adaptive threshold range for the particular quality metric. A self-healing and dynamic optimization task performed based on the determining that the statistical value is outside the adaptive threshold range.

In additional embodiments, a computer-readable storage device is provided having stored thereon computer readable instructions for managing a virtual machine server cluster in a multi-cloud platform by monitoring a plurality of quality metrics. Execution of the computer readable instructions by a processor causes the processor to perform operations comprising the following. For each of the quality metrics, the quality metric is classified as one of a plurality of predetermined quality metric types, the types including a load metric, a utilization metric, a process efficiency metric and a response time metric, accumulated measurement values are recorded for the quality metric, a statistical value is calculated from the accumulated measurement values, and an adaptive threshold range is determined for the quality metric based on the statistical value and based on the predetermined quality metric type.

It is then determined that a statistical value for a particular quality metric is outside the adaptive threshold range for the particular quality metric, and a self-healing and dynamic optimization task is performed based on the determining that the statistical value is outside the adaptive threshold range.

In another embodiment, a system is provided for managing a virtual machine server cluster in a multi-cloud platform by monitoring a plurality of quality metrics. The system comprises a processor resource, a performance measurement interface connecting the processor resource to the virtual machine server cluster, and a computer-readable storage device having stored thereon computer readable instructions.

Execution of the computer readable instructions by the processor resource causes the processor resource to perform operations comprising, for each of the quality metrics, classifying the quality metric as one of a plurality of predetermined quality metric types, the one of a plurality of predetermined quality metric types being a utilization metric; receiving, by the performance measurement interface, accumulated measurement values for the quality metric; calculating, by the processor, a statistical value from the accumulated measurement values; and determining, by the processor, an adaptive threshold range for the quality metric based on the statistical value and based on the predetermined quality metric type.

The operations also include determining, by the processor, that a statistical value for a particular quality metric is outside the adaptive threshold range for the particular quality metric; and performing, by the processor, a self-healing and dynamic optimization task based on the determining that the statistical value is outside the adaptive threshold range, the self-healing and dynamic optimization task comprising adding a resource if the statistical value is above an upper threshold and removing a resource if the statistical value is below a lower threshold.

Figure 1:
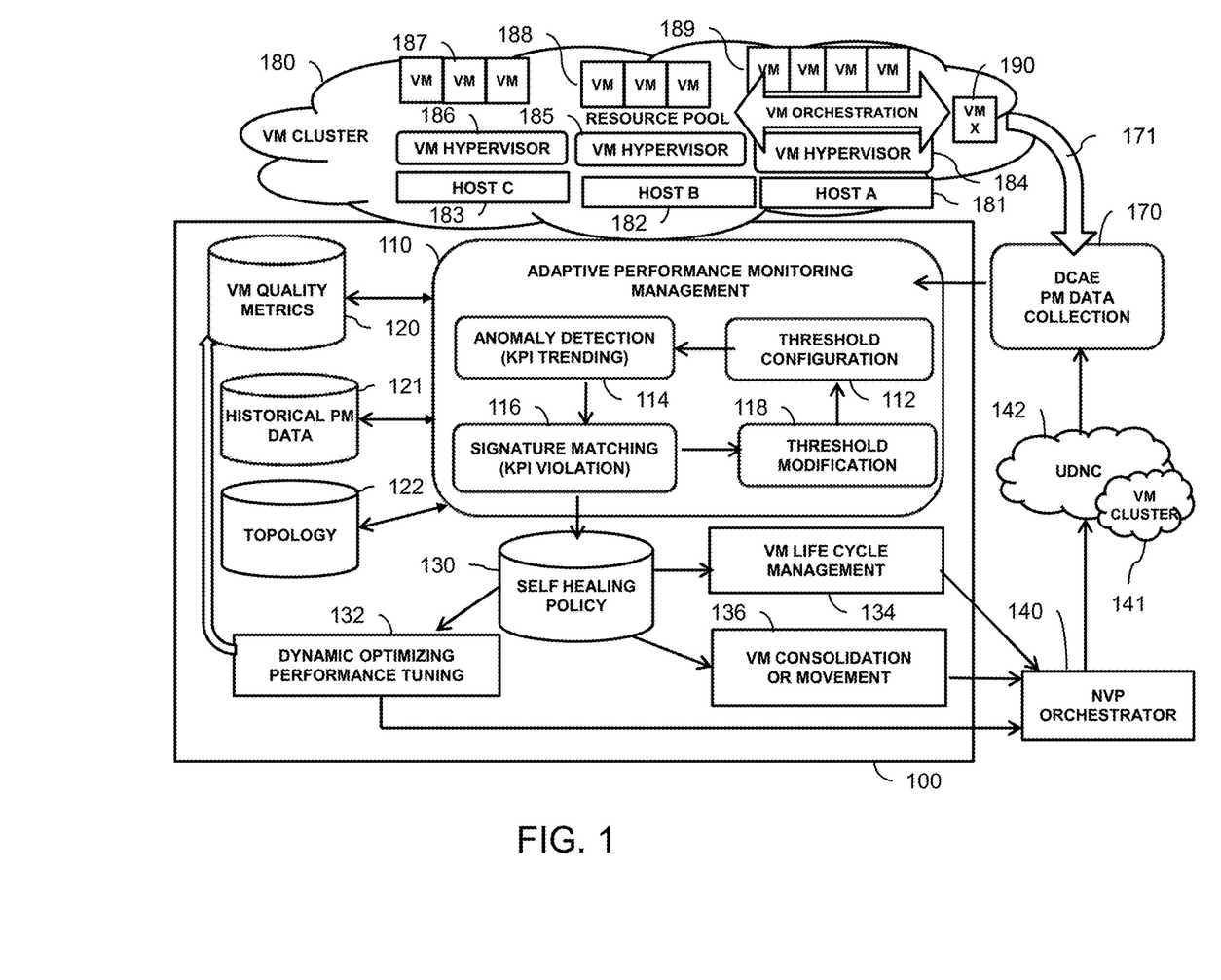
FIG. 1 is a block diagram showing a system for self-healing and dynamic optimization of VM server cluster management according to aspects of the disclosure.

A tool 100 for self-healing and dynamic optimization, shown in FIG. 1, is used in managing a virtual machine server cluster 180. The server cluster 180 includes hosts 181, 182, 183 that underlie instances 184, 185, 186 of a hypervisor. Each hypervisor instance creates and runs a pool of virtual machines 187, 188, 189. Additional virtual machines 190 may be created or moved according to orchestration from the network virtual performance orchestrator 140.

The tool 100 for self-healing and dynamic optimization includes an adaptive performance monitoring management module 110. The management module 110 performs a threshold configuration function 112 in which thresholds are initially set using predefined settings according to the target type, as described in more detail below. Using KPI trending, an anomaly detection function 114 is used to monitor data via a performance measurement interface 171 from a performance monitoring data collection module 170 such as a Data Collection, Analysis, Event (DCAE) component of AT&T's eCOMP™ Framework. KPI violations are identified using signature matching 116 or another event detection technique.

A threshold modification module 118 dynamically and adaptively adjusts the thresholds in real time according to changing conditions as determined in the adaptive performance monitoring management module 110. In addition to the performance monitoring data 170, the management module 110 utilizes various stored data including virtual machine quality metrics 120, historical performance monitoring data 121 and topology awareness 122 in modifying thresholds.

A self-healing policy 130 is established based on output from the adaptive performance monitoring management module 110. The self-healing policy 130 is applied in dynamic optimizing and performance tuning 132, which is used in adjusting the virtual machine quality metrics 120.

The self-healing policy 130 is implemented through virtual life cycle management 134 and in virtual machine consolidation or movement 136. For example, CPUs may be consolidated if a utilization metric falls below 50%. The dynamic optimizing and performance tuning 132, the virtual life cycle management 134 and the virtual machine consolidation or movement 136 are orchestrated by a network virtual performance orchestrator 140, which oversees virtual machine clusters 141 if a user defined network cloud 142.

The presently described application monitoring solution is capable of managing the application layer up/down and degraded. The monitoring infrastructure is also self-configuring. The monitoring components must be able to glean information from inventory sources and from an auto-discovery of the important items to monitor on the devices and servers themselves. The monitoring infrastructure additionally incorporates a self-healing policy that is able to automatically correct common VM server issues so that only issues that really require human attention are routed to operations.

Figure 2:
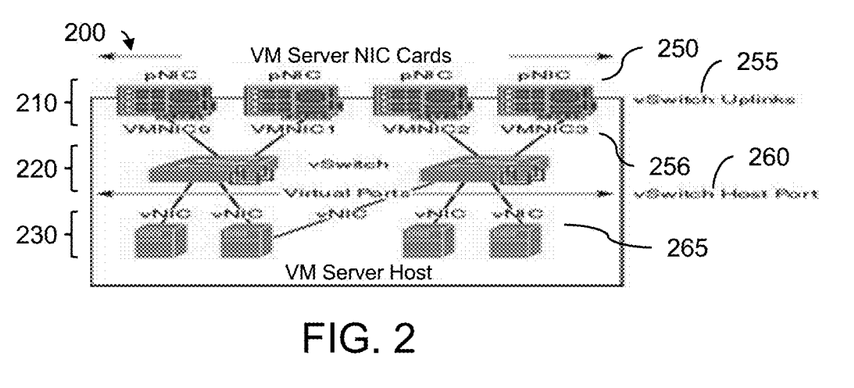
FIG. 2 is a diagram showing virtual devices, physical devices and connections in a VM cluster associated with aspects of the present disclosure.
Figure 3:
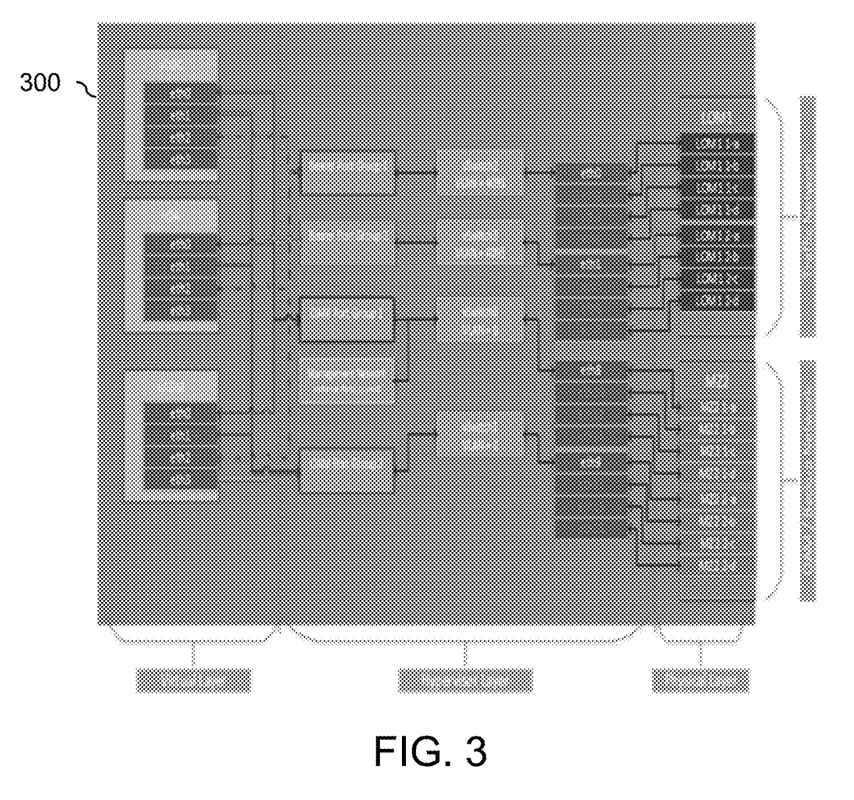
FIG. 3 is a diagram showing overall topology in a VM cluster associated with aspects of the present disclosure.

The monitoring infrastructure is topology-aware at all layers to allow correlation of an application event to a root cause event lower in the stack. Specifically, the monitoring infrastructure is topology-aware at the device or equipment levels as shown by the VM cluster diagram 200 of FIG. 2, including the virtual machine level 210, the vSwitch level 220 and at the virtual NIC level 230. The monitoring infrastructure is also topology-aware at the connection or link level, including the pNIC links 250 from VMNIC ports 256 to vSwitch uplink port 255, and links from vSwitch host ports 260 to vNIC (VM) ports 265.

Traditional server fault management tools used static thresholds for alarming. That approach leads to a huge management issue as each server had to be individually tweaked over time and alarms had to be suppressed if they were over the threshold but still "normal" for that individual server. As part of self-configuration, monitoring must be able to set its own threshold values. Using adaptive thresholding, it is possible to set a threshold on a "not normal" value defined as X standard deviations from the mean, where X is selected based on characteristics of the metric and of the overall system design.

"Adaptive thresholding" refers to the ability to utilize historical statistics to make a determination as to what the exact threshold value should be for a given threshold. In a methodology 400 to set a threshold in accordance with one aspect of the disclosure, shown in FIG. 4, upon instructions 410 to get a threshold, historical data is initially loaded at operation 420 from monitor history files in a performance monitoring database. The monitor history files may be data-interchange format files such as JavaScript Object Notation (.json) files that contain the accumulated local statistics. Since the statistics are based on accumulated values, no large database is needed. For example, each monitor with statistics enabled will generate its own history file named, for example, <monitor>.history.json. Statistics are accumulated in these files by hour and by weekday to allow trending hour by hour and from one week to the next.

Figure 4:
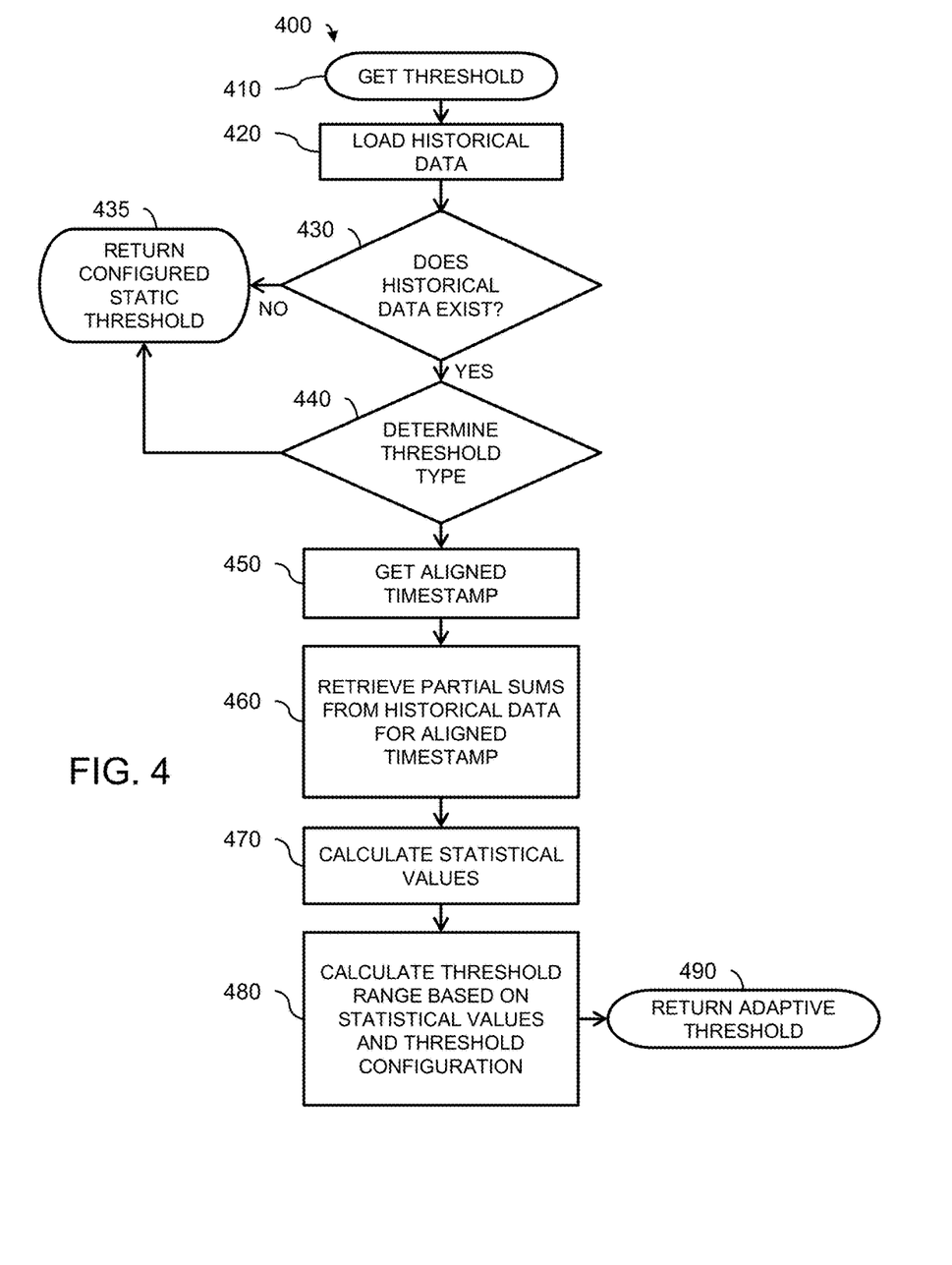
FIG. 4 is a flow chart showing a methodology for retrieving an adaptive threshold according to aspects of the present disclosure.

Monitor value names in an example history file of the methodology are the names of the statistics. In most cases that is the same as the monitor name, but for some complex monitors, the <monitor value name> may match some internal key. The day of the week is a zero-indexed value representing the day of the week (Sunday through Saturday), with zero representing Sunday. The hour and minute of the day are in a time format and represent the sample time. As discussed in more detail below, the sample time is a timestamp tied to the configured SHDO interval and not necessarily the exact timestamp of the corresponding monitor values in monitor.json. That allows normalization of the statistics such that there are a predictable and consistent number of samples per day.

The actual statistics stored in the file do not equate exactly to the available statistics. The file contains the rolling values used to calculate the available statistics. For example, the mean is the sum divided by the count. The SHDO core functions related to statistics will take these values and calculate the available statistics at runtime.

Figure 6:
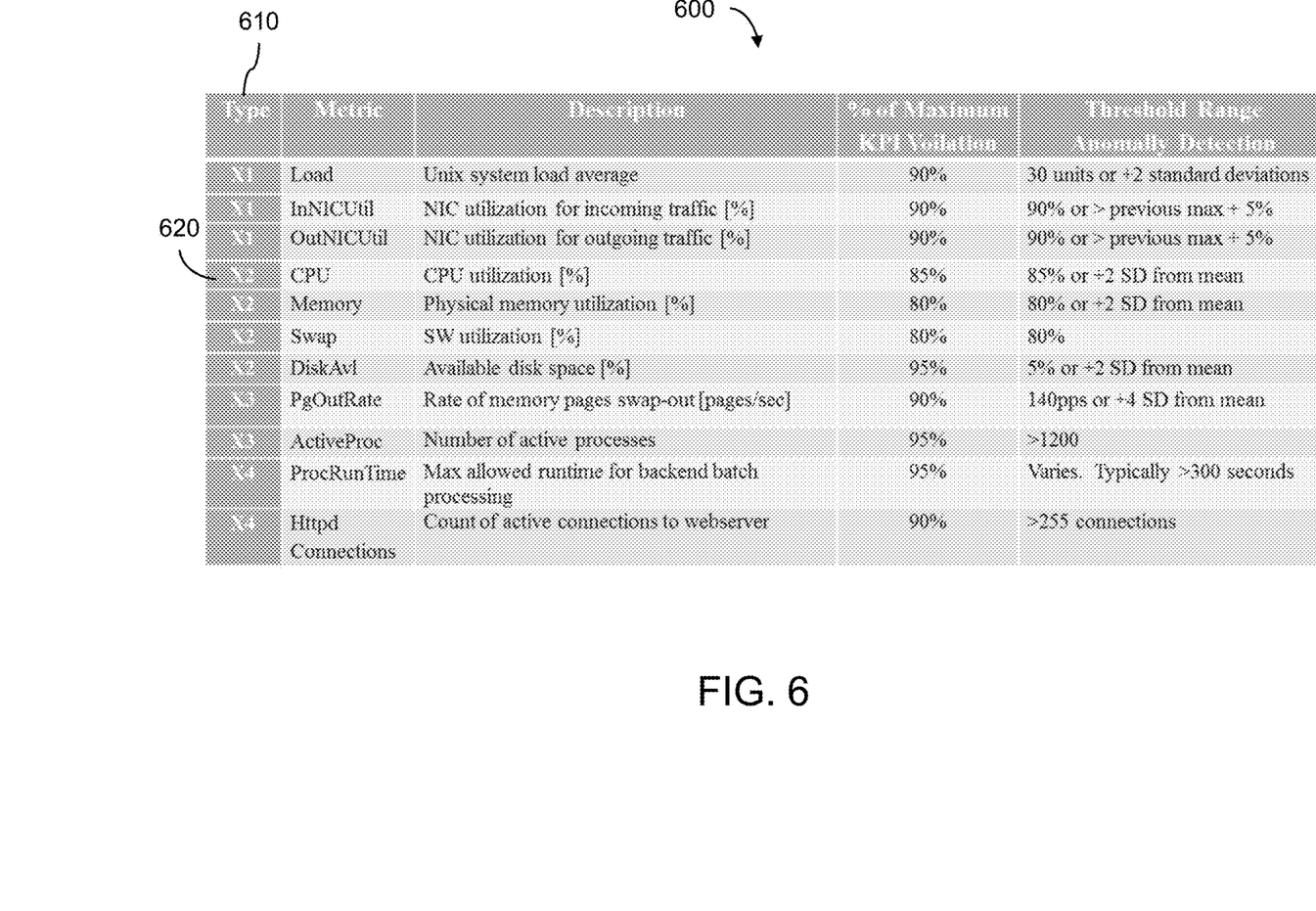
FIG. 6 is a table showing characteristics of various metrics and metric types according to aspects of the present disclosure.

If no historical data exists (decision 430), then a configured static threshold is returned at operation 435. Otherwise, a determination is made as to the type of threshold at decision 440. Because there are a large number of metrics to configure for many different target types, using the standard method can be cumbersome. An implementation of actionable VM quality metrics, shown in the table 600 of FIG. 6, is proposed to specify predefined settings for specific usage patterns to trigger the presently disclosed self-healing and dynamic optimization methodology. Not all metrics have adaptive thresholds. In order to apply an adaptive threshold, the adaptive threshold metrics must fall into one of the following four categories or types 610, as shown in FIG. 6: (1) X1:Load, (2) X2:Utilization, (3) X3:Process Efficiency and (4) X4:Response Time. While those categories were found by the inventors to be particularly effective in the presently disclosed methodology, more, fewer or different categories may be used without departing from the scope of the disclosure. The presently disclosed methodology treats adaptive threshold metrics falling into one category differently than adaptive threshold metrics falling into another category. For example, different statistical values may be calculated for data relating to a load metric than for data relating to a utilization metric. Further, threshold ranges may be calculated differently for different metric categories.

Returning to FIG. 4, if the adaptive threshold metric type does not fall into one of those categories (decision 440), then a configured static threshold is returned at operation 435.

For an adaptive threshold metric type falling into one of the defined categories, an aligned time stamp is then established at operation 450. History update functions are called if the disclosed SHDO package is called for execution with a defined interval. For purposes of the statistics functions in the presently disclosed SHDO methodology, sample time refers to the normalized timestamp to associate with a given sample value. That timestamp is derived from the expected run time of the interval. That is, this is the theoretical time at which the system would timestamp all values if SHDO methodology ran instantaneously. That timestamp is used in place of the true timestamp to ensure that samples are allocated to the correct time bucket in the history file. Sample time is determined by SHDO at the start of its run and that sample time is used for all history file updates for that run. Samples in the history file are stored by the zero-based day of week (0=Sunday, 7=Saturday) and normalized timestamp.

For example, SHDO is scheduled for execution on Tuesday at 10:05:00 with an interval of 5. Upon execution, SHDO calls the current time function which returns 10:05:02 (i.e., not precisely the same as the expected execution time). The sample time function is called on the current time. The sample time function normalizes the actual current time to a sample time value of "10:05" and a sample day value of 2 (Tuesday).

Partial sums are then retrieved at operation 460 from historical data for the aligned timestamp. Since those accumulated values will increase indefinitely, there is a possibility of hidden arithmetic overflow occurring. For example, in the Perl programming language, all numbers are stored in float (double), even on 32-bit platforms. Worst case, the max value of a positive Perl scalar is $2^{\wedge}53$ for integers, or 16 places before or after the decimal without losing significance for floats. Thus, when storing new values, loss of significance must be considered. If loss of significance occurs, the sum, sum of the squares, and count values should all be divided by 2. That allows the values in the history file to remain within bounds and does not greatly alter the resulting statistics values. For example, the mean will be unchanged and standard deviation will change only very slightly due to the fact that this is sample and not population data. For most datasets, those rollover events should be very rare but they still must be accounted for.

Statistical values are then calculated at operation 470 for the historical data. A particular function call of the SHDO system is responsible for reading the history files for all statistics-enabled monitors and providing a hash of the statistics values for threshold use. That function is called prior to the execution of the monitors. The function indexes through all enabled monitors, checking for the existence of a corresponding .json history file, and then loads the available statistics. The applicable portion of the resulting hash is passed to threshold functions in a manner similar to how monitor data is passed. The value loaded from the history file is the value corresponding to the current sample time. Thus, the statistics are defined such as "the average value for the monitor for a Tuesday at 10:05", not the average of all values at all times/days.

The statistical values may include the following: average, maximum value, minimum value, last value, standard, sum of historical values, sum of squares of historical values, and count of values. As noted, the particular statistical values that are loaded depends at least in part on the threshold type. The values are stored in the hash for monitor history.

The adaptive threshold range is then calculated at operation 480 based on the statistical values and on the type and configuration of the threshold. The adaptive threshold is then returned to the calling program at operation 490. One example of an adaptive threshold for "alarm if not normal"

is to alarm if the monitor value being thresholded is greater than two standard deviations from the historical mean.

Figure 5:
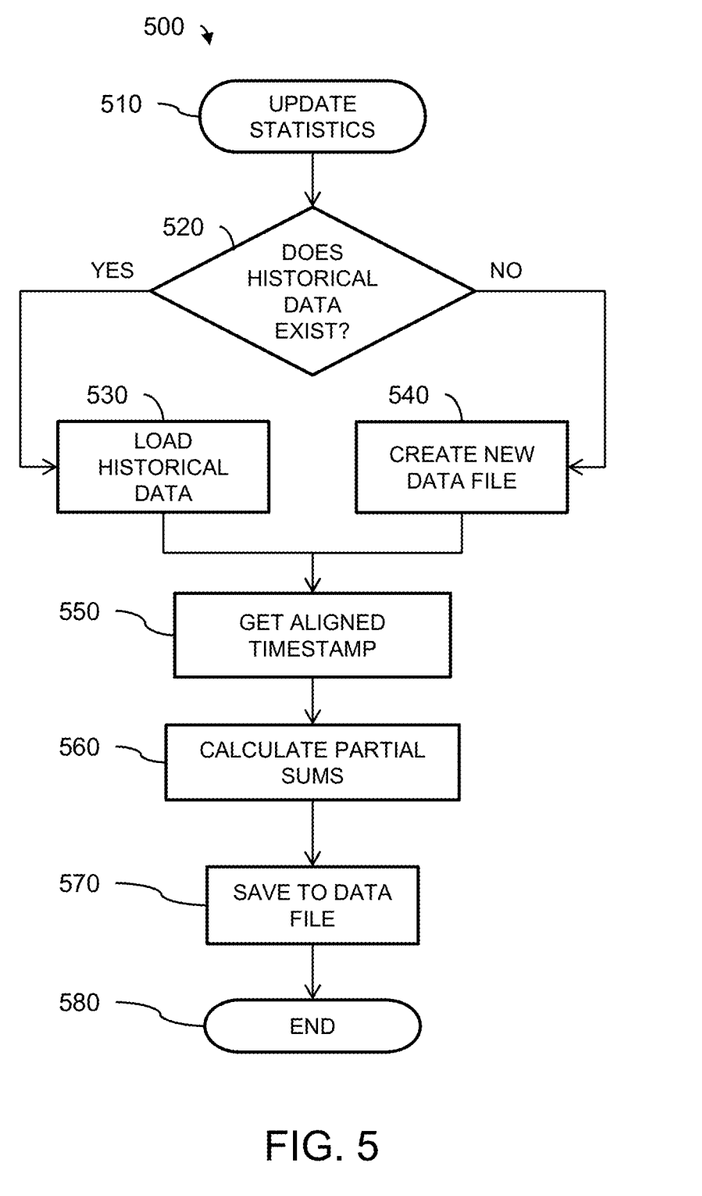
FIG. 5 is a flow chart showing a methodology for updating historical statistics according to aspects of the present disclosure.

A methodology 500 for updating statistics in accordance with one aspect of the disclosure is shown in FIG. 5. Monitor functions within the SHDO module are responsible for calling the function for updating statistics if they wish their data to be saved in history files. That function accepts the monitor name, statistic name, and statistic value as inputs. The sample time and path to history files is already known to the SHDO module so that information need not be supplied. The function opens the history file for the monitor, decodes the .json file into a hash, and writes the new values to the correct day-of-week and time for the statistic.

Upon instructions 510 to update statistics, it is initially determined whether historical data exist, as illustrated by decision block 520. If historical data already exist, then that data is loaded, as shown by operation 530. As noted above, the statistics are based on accumulated values, so no large database is needed. If no historical data exists, then a new data file is created at operation 540. An aligned timestamp is then created at operation 550 for the statistics, as described above.

Partial sums are then calculated for the data at operation 560. The computed partial sums may include a sum of all values, a sum of the squares of the values, a new count value, a new minimum value, a new maximum value and a last value. The particular partial sums computed at operation 560 depends on the type or category of the threshold.

The computed partial sums are then saved to a data file at operation 570 and the function is ended at operation 580.

An example will now be illustrated of anomaly detection and handling based on a threshold range rule (CPU from 50% to 85%). The example uses actual performance monitoring data for CPU utilization 620 (FIG. 6), which is a Type X2 (utilization) threshold. The example uses a simple CPU Rule: add 1 VM if >85% CPU/VM and remove 1 VM if <50% CPU/VM. The rule therefore applies, in addition to the 85% of maximum KPI violation shown in FIG. 6, a minimum CPU utilization of 50%, below which CPU consolidation begins.

Figure 7A:
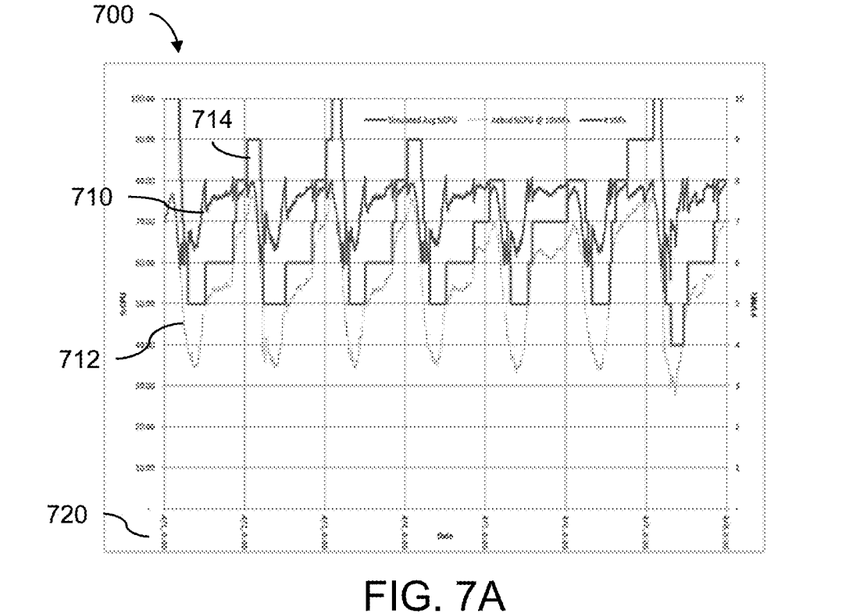
FIG. 7A is a plot showing simulated average CPU usage, actual CPU usage, and number of virtual machines instantiated over a time period of a week, implementing aspects of the present disclosure.

The graph 700 of FIG. 7A shows a simulated average CPU usage 710, an actual CPU usage 712 over 10 virtual machines, and a number of virtual machines 714 instantiated over a time period 720 of approximately one week.

Figure 7B:
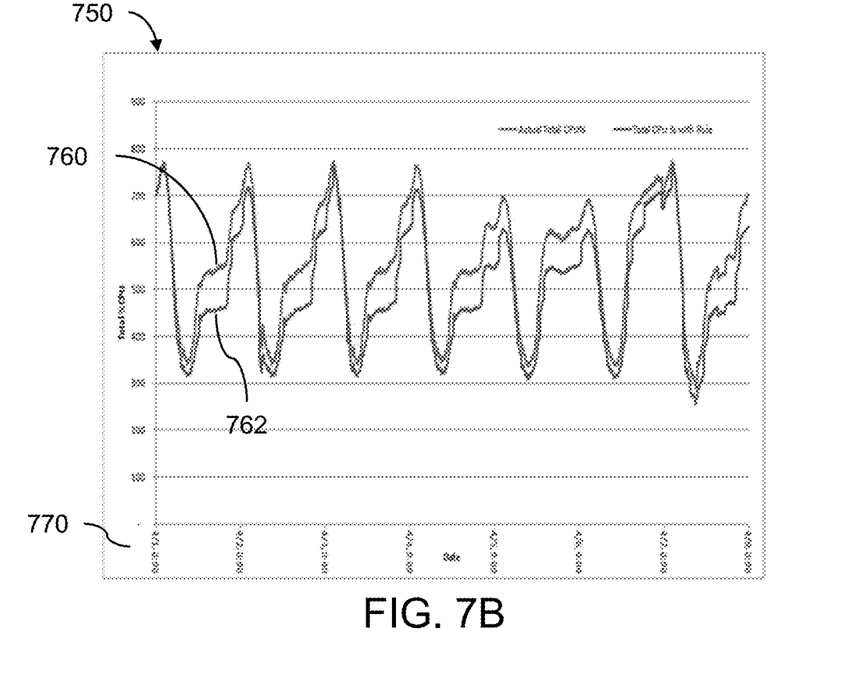
FIG. 7B is a plot showing actual total CPU usage with and without a simple thresholding rule over the same week implementing aspects of the present disclosure.

The graph 750 of FIG. 7B shows an actual total CPU usage without the rule (line 760) and an actual total CPU usage with the rule (line 762) over the same time period 770 of approximately one week. The graph 750 clearly shows a savings benefit in total CPU usage, with more savings at higher CPU usage.

The graphs 700, 750 demonstrate the better utilization of server hardware resulting from implementation of the presently described virtualization. While most applications only use 5-15% of system resources, the virtualization increases utilization up to 85%. Additionally, a higher cache ratio results in more efficient use of CPU. Specifically, average relative CPU savings of 11% is expected. In one demonstration, total average CPU usage was 499%, versus 556% without implementing the rule.

Additional savings are possible by optimizing VM packing and turning off servers. Savings may also be realized from elasticity to serve other services during "non-peak" periods.

Figure 8:
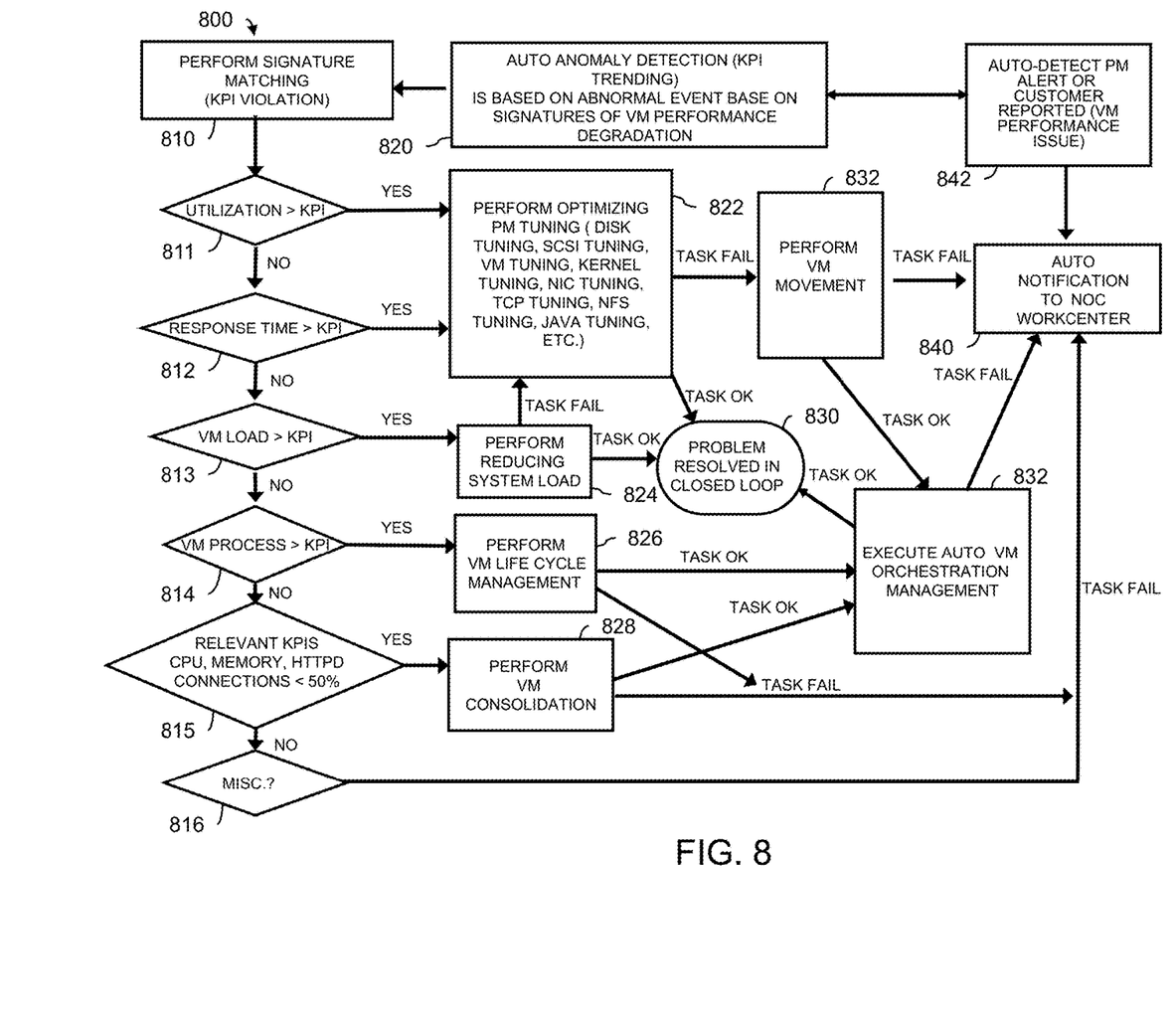
FIG. 8 is a flow chart showing an implementation of rules for self-healing and dynamic optimization of a virtual machine server cluster according to aspects of the present disclosure.

A flow chart 800, shown in FIG. 8, illustrates an example logical flow of a dynamic optimization methodology according to the present disclosure. The process may be initiated at block 842 by an automatic detection of a performance monitoring alert or a customer-reported alert indicating a virtual machine performance issue. The alert may be forwarded to a network operating work center 840 and/or to an automatic anomaly detection process 820. The automatic anomaly detection 820 or KPI trending is based on an abnormal event detected using signatures indicating virtual machine performance degradation.

Signature matching 810 is initially performed to detect KPI violations. The methodology performs a series of comparisons 811-816 according to metric types, to detect instances where thresholds are exceeded. If a utilization metric 811 or a response time metric 812 exceeds the KPI for that metric, then the methodology attempts to optimize the performance metric tuning at operation 822. For example, the system may attempt to perform disk tuning, SCSI tuning, VM tuning, kernel tuning, NIC tuning, TCP tuning, NFS tuning, JAVA tuning, etc. If the optimization 822 is successful, then the problem is considered resolved within the closed loop at operation 930.

If the optimization 822 fails, then the systems attempts virtual machine movement at operation 832. If that fails, then the system performs an auto notification to a network operating work center at operation 840, resulting in human/manual intervention.

If the virtual machine movement 832 is successful, then an automatic virtual machine orchestration management function 832 is called, and the problem is considered resolved at operation 830.

If a virtual machine load metric 813 exceeds the KPI for that metric, the system attempts to reduce the system load at operation 824. If that task fails, then optimizing PM tuning is performed at operation 822 as described above. A successful reduction of system load results in the problem being considered resolved at operation 830.

If a virtual machine process metric 814 exceeds the KPI for that metric, the system attempts to perform virtual machine life cycle management at operation 826. If that task fails, the system performs an auto notification to a network operating work center at operation 840 as described above. If the virtual machine life cycle management is successful, then the automatic virtual machine orchestration management function 832 is called, and the problem is considered resolved at operation 830.

The example system also checks if any relevant KPIs, CPU, memory, HTTPD connections, etc. are below 50% at decision 815. If so, the system attempts to perform virtual machine consolidation at operation 828. If successful, then the automatic virtual machine orchestration management function 832 is called, and the problem is considered resolved at operation 830. If that task fails, the system performs an auto notification to a network operating work center at operation 840 as described above.

Additional or miscellaneous metrics may also be checked (operation 816) and additional actions taken if those metrics are found to be outside threshold limits.

Several use cases demonstrating the presently disclosed self-healing policy will now be discussed. A first case 900, shown in FIG. 9, relates to preventing site/application overload using adaptive thresholding of the ProcRunTime metric. The methodology initially checks for processes exceeding normal runtime at operation 910. A check_procruntime function retrieves the current process runtimes for all target processes at operation 912, and calculates a threshold value using the adaptive threshold algorithm at operation 914. If the runtimes are found not to exceed the threshold at decision 916, then the workflow is ended at 918.

Figure 9:
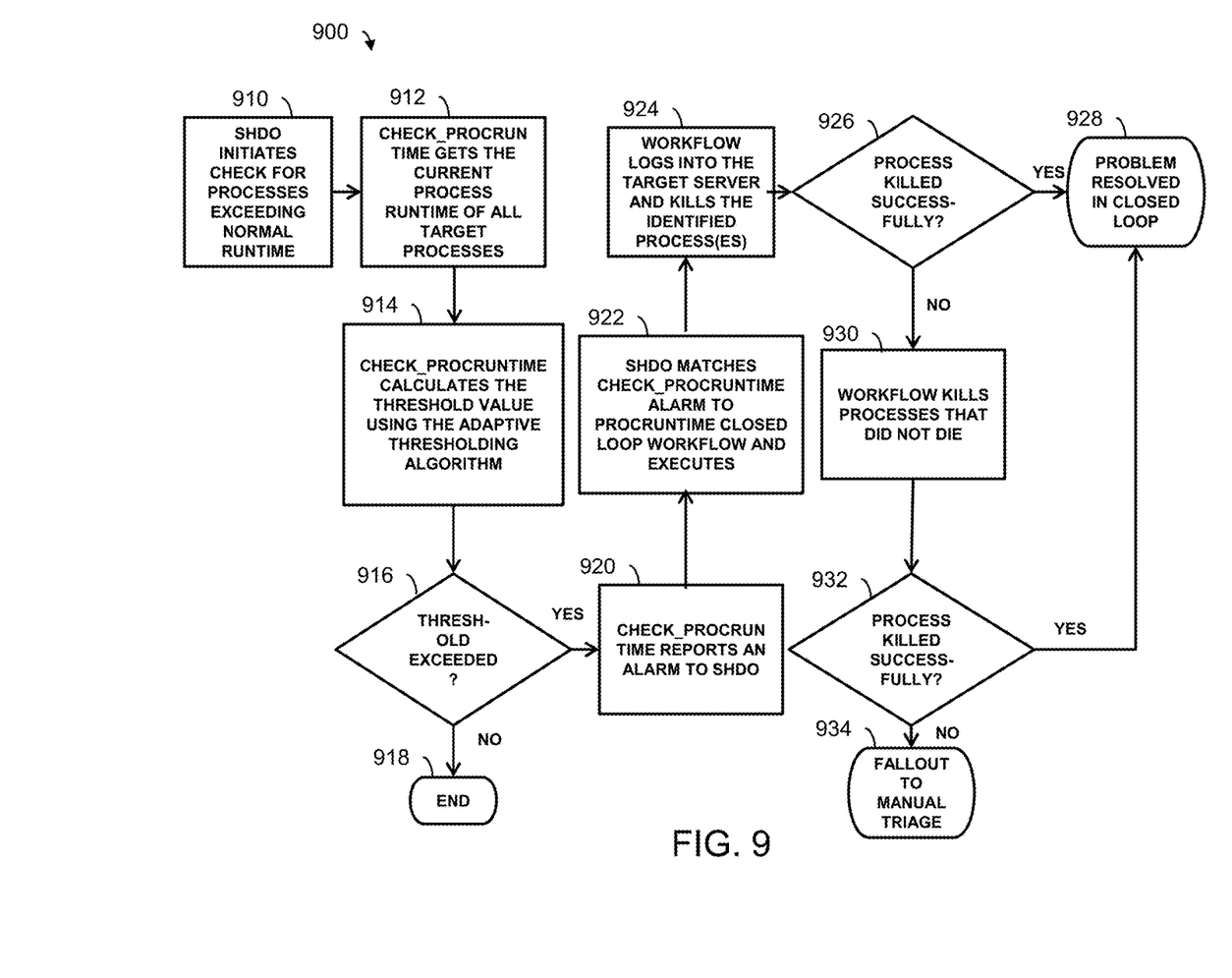
FIG. 9 is a flow chart showing a use case for adaptive thresholding of process run times according to aspects of the present disclosure.

If the threshold is exceeded, then the check_procruntime function reports an alarm to the SHDO system at operation 920. The SHDO system matches the check_procruntime alarm to the ProcRunTime metric and executes the closed loop workflow at operation 922. The workflow logs into the target server and kills the identified processes at operation 924.

The SHDO system then checks at decision 926 whether the identified processes were successfully killed. If so, then the problem is considered resolved in the closed loop and the process ends at block 928. If one or more of the identified processes were not successfully killed, then the workflow makes another attempt to kill those processes at operation 930. Another check is made that the processes were killed at decision 932. If so, then the problem is considered resolved. If not, then the process is transferred to manual triage at operation 934.

Figure 10:
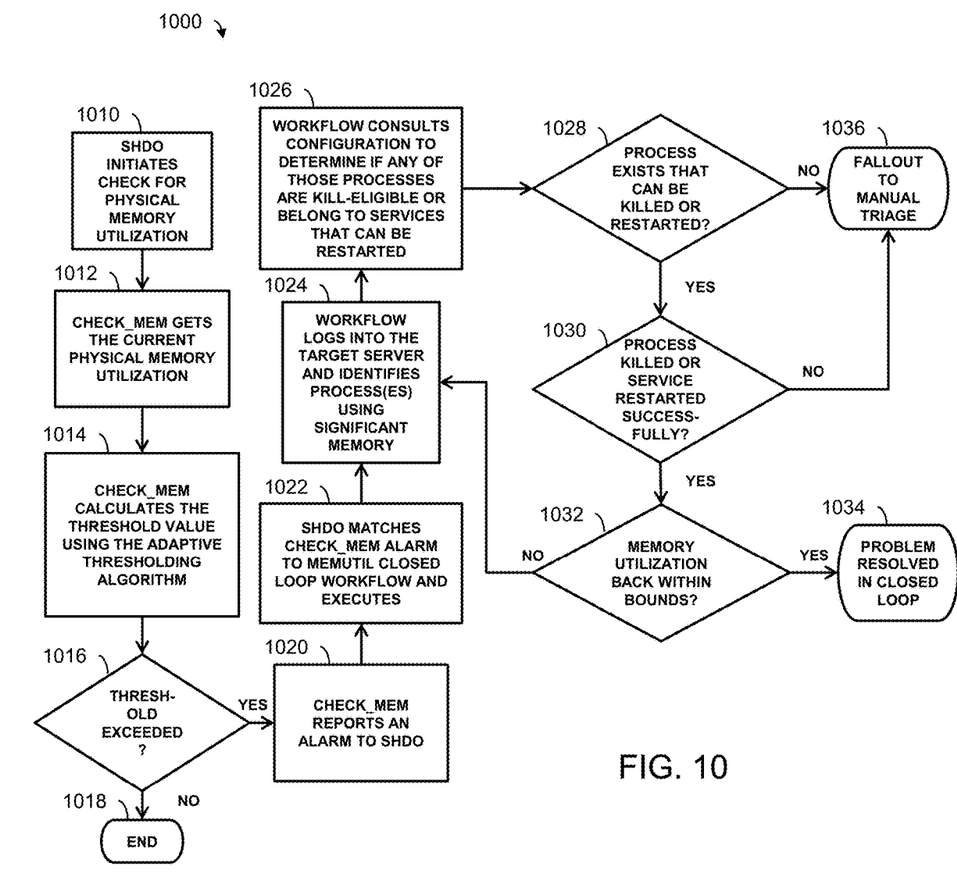
FIG. 10 is a flow chart showing a use case for adaptive thresholding of memory according to aspects of the present disclosure.

In another use case 1000, shown in FIG. 10, site/application overload is prevented using adaptive thresholding of memory. The methodology initially checks for physical memory utilization at operation 1010. A check_mem function retrieves the current physical memory utilization at operation 1012, and calculates a threshold value using the adaptive threshold algorithm at operation 1014. If the retrieved utilization is found not to exceed the threshold at decision 1016, then the workflow is ended at 1018.

In the case where the threshold is exceeded, the check_mem function reports an alarm to the SHDO system at operation 1020, and the SHDO system matches the check_mem alarm to a MemUtil closed loop workflow and executes at operation 1022. The workflow logs into the target server and identifies any processes that are using significant memory at operation 1024.

The workflow then consults the network configuration at operation 1026 to determine whether any of those identified processes are kill-eligible or belong to services that can be restarted. If the workflow determines at decision 1028 that no processes exists that can be killed or restarted, then the closed loop workflow is stopped and problem is assigned to manual triage at block 1036. Otherwise, the workflow attempts to kill or restart the eligible processes and success is evaluated at decision block 1030. If the attempt is unsuccessful, then the workflow resorts to manual triage 1036. If the processes were successfully killed to restarted, then the workflow determines at decision 1032 whether memory utilization is back within bounds. If so, the workflow ends at block 1034. If not, the workflow loops back to operation 1024 to identify additional processes using significant memory.

In another use case, virtual machine spawning is prevented from exhausting resources. This is required to protect against the case where a VM configuration error in a SIP client causes all spawning of new VM's to fail. The SIP client may keep spawning new VMs until there is no additional disk/memory/IP available. The lack of disk/memory/IP causes the performance of the operating VMs to deteriorate.

Additionally, the continued failure of VM spawning fills the redirection table of the SIP Proxy, preventing the SIP proxy from pointing to the correct VM (fail-over mechanism dysfunction). No functioning virtual machines therefore survive.

The problem of exhausting resources by VM spawning is addressed by several features of the presently described system wherein adaptive thresholding is used for VM memory to reduce incoming load. First, a sliding window is used for provisioning multiple VMs, allowing only a maximum of K ongoing tasks, where K is a predetermined constant established based on network characteristics. The sliding window prevents the system from continued provisioning when failure occurs. By fixing the size of the processing queue to K tasks, a new provisioning task is performed only when the queue has a free slot. Failed tasks and completed tasks are removed from the queue.

In another feature of the presently described system, failed tasks are moved from the processing queue to a fail queue. VM provisioning fails, as described above, are put in the fail queue and are removed from the fail queue after a timeout. When the size of the fail queue exceeds a threshold, the system stops admitting provisioning tasks. In that way, the system does not continue provisioning when a provisioning failure is recurring.

The system additionally enforces dual or multiple constraints on provisioning tasks. Specifically, each provisioning task is examined both (1) by the queues in the physical machine and (2) by the queues in the service group. The system detects instances where VM provisioning often fails in a certain physical machine, and instances where VM provisioning often fails in a certain service group (e.g., a region in USP, or an SBC cluster). The system addresses the detected problem by, for example, taking the problem physical machine off line, or diagnosing a problem in a service group.

The hardware and the various network elements discussed above comprise one or more processors, together with input/output capability and computer readable storage devices having computer readable instructions stored thereon that, when executed by the processors, cause the processors to perform various operations. The processors may be dedicated processors, or may be mainframe computers, desktop or laptop computers or any other device or group of devices capable of processing data. The processors are configured using software according to the present disclosure.

Each of the hardware elements also includes memory that functions as a data memory that stores data used during execution of programs in the processors, and is also used as a program work area. The memory may also function as a program memory for storing a program executed in the processors. The program may reside on any tangible, non-volatile computer-readable storage device as computer readable instructions stored thereon for execution by the processor to perform the operations.

Generally, the processors are configured with program modules that include routines, objects, components, data structures and the like that perform particular tasks or implement particular abstract data types. The term "program" as used herein may connote a single program module or multiple program modules acting in concert. The disclosure may be implemented on a variety of types of computers, including personal computers (PCs), hand-held devices, multi-processor systems, microprocessor-based programmable consumer electronics, network PCs, mini-computers, mainframe computers and the like, and may employ a distributed computing environment, where tasks are performed by remote processing devices that are linked through a communications network. In a distributed computing environment, modules may be located in both local and remote memory storage devices.

An exemplary processing module for implementing the methodology above may be stored in a separate memory that is read into a main memory of a processor or a plurality of processors from a computer readable storage device such as a ROM or other type of hard magnetic drive, optical storage, tape or flash memory. In the case of a program stored in a memory media, execution of sequences of instructions in the module causes the processor to perform the process operations described herein. The embodiments of the present disclosure are not limited to any specific combination of hardware and software.

The term "computer-readable medium" as employed herein refers to a tangible, non-transitory machine-encoded medium that provides or participates in providing instructions to one or more processors. For example, a computer-readable medium may be one or more optical or magnetic memory disks, flash drives and cards, a read-only memory or a random access memory such as a DRAM, which typically constitutes the main memory. The terms "tangible media" and "non-transitory media" each exclude transitory signals such as propagated signals, which are not tangible and are not non-transitory. Cached information is considered to be stored on a computer-readable medium. Common expedients of computer-readable media are well-known in the art and need not be described in detail here.

The forgoing detailed description is to be understood as being in every respect illustrative and exemplary, but not restrictive, and the scope of the disclosure herein is not to be determined from the description, but rather from the claims as interpreted according to the full breadth permitted by the patent laws. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings. It is to be understood that various modifications will be implemented by those skilled in the art, without departing from the scope and spirit of the disclosure.

What is claimed is:

1. A method for managing a virtual machine server cluster in a multi-cloud platform, comprising:
   supporting a group of statistics for selecting metric statistics, the group of statistics including each of average, maximum value, minimum value, last value, standard, sum of historical values, sum of squares of historical values, and count of values;
   classifying a first quality metric into a load metric class, wherein members of the load metric class indicate a load on a virtual machine;
   selecting a load metric statistic based on the classifying the first quality metric into the load metric class, the load metric statistic being selected from the group of statistics;
   accumulating values for one or more load metric partial sums from performance monitoring data relating to the first quality metric, the load metric partial sums being selected to calculate a value of the load metric statistic;
   calculating the value of the load metric statistic from the load metric partial sums accumulated from performance monitoring data relating to the first quality metric;
   classifying a second quality metric into a utilization metric class, wherein members of the utilization metric class indicate a utilization of hardware by the virtual machine;
   selecting a utilization metric statistic based on the classifying the second quality metric into the utilization metric class, the utilization metric statistic being selected from the group of statistics and being different from the load metric statistic;
   accumulating values for one or more utilization metric partial sums from performance monitoring data relating to the second quality metric, the utilization metric partial sums being selected to calculate a value of the utilization metric statistic;
   calculating the value of the utilization metric statistic from the load metric partial sums accumulated from performance monitoring data relating to the second quality metric;
   determining an adaptive threshold range for the first quality metric based on the value of the load metric statistic and based on the classifying the first quality metric into the load metric class;
   determining an adaptive threshold range for the second quality metric based on the value of the utilization metric statistic and based on the classifying the second quality metric into the utilization metric class;
   determining that a monitoring value for one of the first quality metric and the second quality metric is outside the adaptive threshold range for the one quality metric;
   performing a self-healing and dynamic optimization task based on the determining that the monitoring value is outside the adaptive threshold range;
   determining that a value of one of the partial sums accumulated from performance monitoring data relating to one of the quality metrics exceeds a limit imposed to prevent arithmetic overflow of a value storage; and
   dividing values of each partial sum accumulated from performance monitoring data relating to the one of the quality metrics by two.

2. The method of claim 1, further comprising classifying a third quality metric into one of a process efficiency metric class and a response time metric class.

3. The method of claim 1, wherein the quality metric for which the monitoring value is determined to be outside the adaptive threshold range is the second quality metric, and performing the self-healing and dynamic optimization task comprises adding a resource if the monitoring value is above an upper threshold of the adaptive threshold range for the second quality metric and removing a resource if the monitoring value is below a lower threshold of the adaptive threshold range for the second quality metric.

4. The method of claim 1, wherein the quality metric for which the monitoring value is determined to be outside the adaptive threshold range is the second quality metric, and performing the self-healing and dynamic optimization task comprises performing optimizing resource tuning.

5. The method of claim 1, wherein the quality metric for which the monitoring value is determined to be outside the adaptive threshold range is the first quality metric, and performing the self-healing and dynamic optimization task comprises adjusting a system load.

6. The method of claim 1, further comprising:
   classifying a third quality metric into a process efficiency metric class, wherein members of the process efficiency metric class indicate a number of active processes;
   selecting a process efficiency metric statistic based on the classifying the third quality metric into the process efficiency metric class, the process efficiency metric statistic being selected from the group of statistics;

accumulating values for one or more process efficiency metric partial sums from performance monitoring data relating to the third quality metric, the process efficiency metric partial sums being selected to calculate a value of the process efficiency metric statistic;

calculating the value of the process efficiency metric statistic from the process efficiency metric partial sums accumulated from performance monitoring data relating to the third quality metric;

wherein the quality metric for which the monitoring value is determined to be outside the adaptive threshold range is the third quality metric, and performing the self-healing and dynamic optimization task comprises performing virtual machine life cycle management.

7. The method of claim 1, further comprising:
associating a single, normalized timestamp with all the partial sum values that are accumulated in a single execution of a history update function.

8. The method of claim 1, wherein the partial sums include a sum value, a sum-of-the-squares value, and a count value.

9. A computer-readable storage device having stored thereon computer readable instructions for managing a virtual machine server cluster in a multi-cloud platform, wherein execution of the computer readable instructions by a processor causes the processor to perform operations comprising:

supporting a group of statistics for selecting metric statistics, the group of statistics including each of average, maximum value, minimum value, last value, standard, sum of historical values, sum of squares of historical values, and count of values;

classifying a first quality metric into a load metric class, wherein members of the load metric class indicate a load on a virtual machine;

selecting a load metric statistic based on the classifying the first quality metric into the load metric class, the load metric statistic being selected from the group of statistics;

accumulating values for one or more load metric partial sums from performance monitoring data relating to the first quality metric, the load metric partial sums being selected to calculate a value of the load metric statistic;

calculating the value of the load metric statistic from the load metric partial sums accumulated from performance monitoring data relating to the first quality metric;

classifying a second quality metric into a utilization metric class, wherein members of the utilization metric class indicate a utilization of hardware by the virtual machine;

selecting a utilization metric statistic based on the classifying the second quality metric into the utilization metric class, the utilization metric statistic being selected from the group of statistics and being different from the load metric statistic;

accumulating values for one or more utilization metric partial sums from performance monitoring data relating to the second quality metric, the utilization metric partial sums being selected to calculate a value of the utilization metric statistic;

calculating the value of the utilization metric statistic from the load metric partial sums accumulated from performance monitoring data relating to of the second quality metric;

determining an adaptive threshold range for the first quality metric based on the value of the load metric statistic and based on the classifying the first quality metric into the load metric class;

determining an adaptive threshold range for the second quality metric based on the value of the utilization metric statistic and based on the classifying the second quality metric into the utilization metric class;

determining that a monitoring value for one of the first quality metric and the second quality metric is outside the adaptive threshold range for the one quality metric; and performing a self-healing and dynamic optimization task based on the so determining that the monitoring value is outside the adaptive threshold range;

determining that a value of one of the partial sums accumulated from performance monitoring data relating to one of the quality metrics exceeds a limit imposed to prevent arithmetic overflow of a value storage; and dividing values of each partial sum accumulated from performance monitoring data relating to the one of the quality metrics by two.

10. The computer-readable storage device of claim 9, wherein the quality metric for which the monitoring value is determined to be outside the adaptive threshold range is the second quality metric, and performing the self-healing and dynamic optimization task comprises adding a resource if the monitoring value is above an upper threshold of the adaptive threshold range for the second quality metric and removing a resource if the monitoring value is below a lower threshold of the adaptive threshold range for the second quality metric.

11. The computer-readable storage device of claim 9, wherein the quality metric for which the monitoring value is determined to be outside the adaptive threshold range is the second quality metric, and performing the self-healing and dynamic optimization task comprises performing optimizing resource tuning.

12. The computer-readable storage device of claim 9, wherein the quality metric for which the monitoring value is determined to be outside the adaptive threshold range is the first quality metric, and performing the self-healing and dynamic optimization task comprises adjusting a system load.

13. The computer-readable storage device of claim 9, further comprising:

classifying a third quality metric into a process efficiency metric class, wherein members of the process efficiency metric class indicate a number of active processes;

selecting a process efficiency metric statistic based on the classifying the third quality metric into the process efficiency metric class, the process efficiency metric statistic being selected from the group of statistics;

accumulating values for one or more process efficiency metric partial sums from performance monitoring data relating to the third quality metric, the process efficiency metric partial sums being selected to calculate a value of the process efficiency metric statistic;

calculating the value of the process efficiency metric statistic from the process efficiency metric partial sums accumulated from performance monitoring data relating to the third quality metric;

wherein the quality metric for which the monitoring value is determined to be outside the adaptive threshold range is the third quality metric, and performing the self-healing and dynamic optimization task comprises performing virtual machine life cycle management.

14. The computer-readable storage device of claim 9, wherein the operations further comprise:
associating a single, normalized timestamp with all the partial sum values that are accumulated in a single execution of a history update function.

15. The computer-readable storage device of claim 9, wherein the partial sums include a sum value, a sum-of-the-squares value, and a count value.

16. A system for managing a virtual machine server cluster in a multi-cloud platform, comprising:
a processor resource;
a performance measurement interface connecting the processor resource to the virtual machine server cluster; and
a computer-readable storage device having stored thereon computer readable instructions, wherein execution of the computer readable instructions by the processor resource causes the processor resource to perform operations comprising:
supporting a group of statistics for selecting metric statistics, the group of statistics including each of average, maximum value, minimum value, last value, standard, sum of historical values, sum of squares of historical values, and count of values;
receiving, by the performance measurement interface, performance monitoring data of a first quality metric and a second quality metric;
classifying, by the processor, the first quality metric into a load metric class, wherein members of the load metric class indicate a load on a virtual machine;
selecting a load metric statistic based on the classifying the first quality metric into the load metric class, the load metric statistic being selected from the group of statistics;
accumulating values for one or more load metric partial sums from the performance monitoring data of the first quality metric, the load metric partial sums being selected to calculate a value of the load metric statistic;
calculating, by the processor, the value of the load metric statistic from the load metric partial sums accumulated from the performance monitoring data of the first quality metric;
classifying, by the processor, the second quality metric into a utilization metric class, wherein members of the utilization metric class indicate a utilization of hardware by the virtual machine;
selecting a utilization metric statistic based on the classifying the second quality metric into the utilization metric class, the utilization metric statistic being selected from the group of statistics and being different from the load metric statistic;
accumulating values for one or more utilization metric partial sums from performance monitoring data relating to the second quality metric, the utilization metric partial sums being selected to calculate a value of the utilization metric statistic;
calculating, by the processor, the value of the utilization metric statistic from the load metric partial sums accumulated from performance monitoring data relating to the second quality metric;
determining, by the processor, an adaptive threshold range for the first quality metric based on the value of the load metric statistic and based on the classifying the first quality metric into the load metric class;
determining, by the processor, an adaptive threshold range for the second quality metric based on the value of the utilization metric statistic and based on the classifying the second quality metric into the utilization metric class;
determining, by the processor, that a monitoring value for one of the first quality metric and the second quality metric is outside the adaptive threshold range for the one quality metric; and
performing, by the processor, a self-healing and dynamic optimization task based on the determining that the monitoring value for the second quality metric is outside the adaptive threshold range, the self-healing and dynamic optimization task comprising adding a computing resource if the statistical value is above an upper threshold and removing a computing resource if the statistical value is below a lower threshold;
determining that a value of one of the partial sums accumulated from performance monitoring data relating to one of the quality metrics exceeds a limit imposed to prevent arithmetic overflow of a value storage; and
dividing values of each partial sum accumulated from performance monitoring data relating to the one of the quality metrics by two.

17. The system of claim 16, further comprising:
associating a single, normalized timestamp with all the partial sum values that are accumulated in a single execution of a history update function.

18. The system of claim 16, wherein the partial sums comprise a sum value, a sum-of-the-squares value, and a count value.

* * * * *